May 12, 1959    L. D. COBB    2,886,153

ONE-WAY CLUTCH

Filed Feb. 18, 1954

INVENTOR
Leland D. Cobb
BY Edward H. Goodrich
ATTORNEY

United States Patent Office 2,886,153
Patented May 12, 1959

2,886,153

ONE-WAY CLUTCH

Leland D. Cobb, Forestville, Conn., assignor to General Motors Corporation, Detroit, Mich., a corporation of Delaware Application February 18, 1954, Serial No. 412,755

9 Claims. (Cl. 192—45.1)

The present invention relates to one way clutches which employ a plurality of so-called "sprags" or tiltable grippers and more particularly to cage means for retaining the sprags in engagement with a pair of relatively rotatable concentric races.

In one way clutches employing a plurality of identical sprags or tiltable grippers disposed between a pair of relatively rotatable races, it is desirable to employ cage means for positioning the sprags at substantially uniform circumferential intervals between the races. In order to insure all of the sprags moving into or out of engagement at the same time, it has been found advantageous for the cage means to include a pair of relatively rotatable cages that engage the sprags on the opposite sides thereof and at radially spaced points. Thus whenever one sprag moves into or out of locking engagement with the races, the two cages will relatively rotate in opposite directions and cause all of the remaining sprags to simultaneously tilt in the same direction. Heretofore, such movement of the cages has been solely a result of movement of one or more of the sprags.

It is now proposed to provide cage means having a pair of relatively rotatable cages for biasing the sprags against the races. The cage means may employ spring means for resiliently biasing the cages for rotation in opposite directions. The springs are preferably disposed between the cages with the opposite ends thereof secured to the two cages so as to resiliently bias the cages in opposite directions. Since the cages engage the sprags at radially spaced points, this will tend to turn the sprags so that the opposite ends thereof will engage the races at all times.

When cage means are employed for positioning a plurality of sprags between a pair of races and particularly when two cages are employed, it is highly desirable that the cages be concentric with the races at all times. If the cages are disposed eccentric to the races when all of the sprags move into a wedging position between the races, they must first move the cages into concentric relation in order to maintain the sprags properly spaced.

It is now proposed to provide means for maintaining the cages properly centered at all times. This is to be accomplished by employing sprags having shoulders thereon which are adapted to engage at least one of the cages and maintain them properly positioned. The other cage may be adapted to engage the supported cage and thereby be carried in concentric relation.

Figure 1:
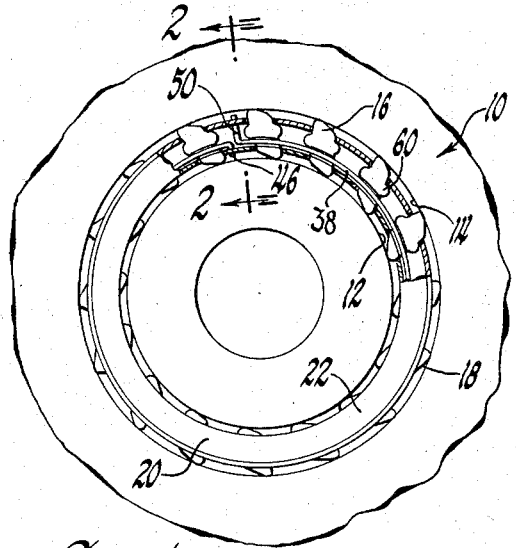
Fig. 1 is a side elevational view of a one way clutch employing the present invention, a portion thereof being broken away.
Figure 2:
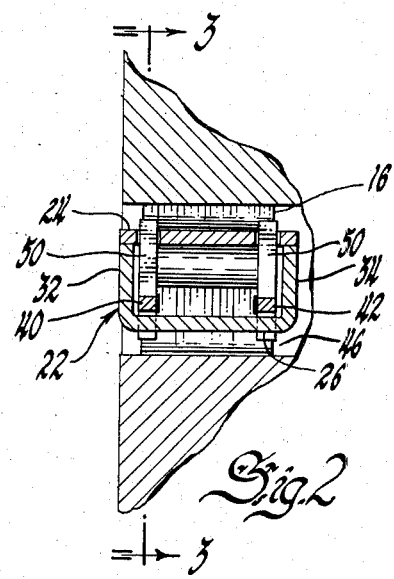
Fig. 2 is a cross sectional view taken substantially along the plane of line 2—2 in Fig. 1.

Referring to the drawing in more detail, the present invention may be embodied in any suitable one way clutch 10 that is adapted to be disposed between a substantially cylindrical inner race 12 and a substantially cylindrical outer race 14 disposed in spaced concentric relation therewith. In the present instance the clutch is of the so-called "sprag" type wherein a plurality of substantially identical tiltable grippers or sprags 16 are adapted to be disposed in circumferentially spaced relation between the inner and oouter races 12 and 14. Each of the sprags 16 are disposed in a nearly radial position about the axis of rotation. The inner and outer ends of the sprags may be provided with cam surfaces 18 for engaging the races 12 and 14. The cam surfaces 18 are disposed so that one diagonal of the sprags 16 is not only longer than the other diagonal but is also longer than the radial distance between the two races 12 and 14. The cam surfaces 18 are adapted to be held in engagement with the races 12 and 14 so that when the outer race 14 rotates counterclockwise relative to the inner race 12, the cam surfaces 18 will merely slide on the races 12 and 14 but when the outer race 14 rotates clockwise relative to the inner race 12, the sprags 16 will be tilted clockwise so that the longer diagonal will be more nearly radial. Since the one diagonal is longer than the radial distance between the races, the sprags 16 will be wedged between the inner and outer races 12 and 14. Thus when the outer race 14 rotates counterclockwise relative to the inner race 12, it will overrun the inner race 12, but when it rotates clockwise relative thereto, the sprags 16 will be in a wedged position so as to transmit torque from one race to the other.

Any suitable cage means 20 may be disposed between the races 12 and 14 for retaining the sprags 16 in substantially uniformly spaced relation about the space between the races 12 and 14. In the present instance the cage means 20 embodies a pair of relatively rotatable cages including an inner cage 22 and an outer cage 24.

The inner cage 22 may have a cylindrical base 26 whose radius is slightly larger than that of the inner race 12 so that it may be disposed in concentric spaced relation with the inner race 12. The base portion 26 may include a plurality of equally spaced openings 28 each of which is adapted to receive one sprag 16. The openings 28 are preferably substantially the same size as the sprags 16 so that there will be a close fit therebetween which will provide a minimum amount of clearance between the sprags 16 and the edges of the openings 28. However, these openings are of sufficient size to permit tiltable movement of the sprags therein. The inner ends 30 of the sprags 16 may project inwardly from the cage 22 with the cam surfaces 18 thereon being disposed in engagement with the inner race 12. The opposite sides of the base portion 26 may have flanges 32 and 34 projecting therefrom. The present flanges 32 and 34 extend radially outwardly from the base portion 26 so that the periphery thereof is disposed in spaced relation to the races 12 and 14.

The outer cage 24 comprises a cylindrical member slidably piloted on the flanges 32, 34 and surrounded in spaced relation by the outer race 14. Hence, the two cages 22 and 24 will always be concentric and relatively rotatable. A plurality of equally spaced openings 36 may be provided in the outer cage 24. These openings 36 may be similar to the openings 28 through the inner cage 22 and positioned to register therewith. Thus the outer ends of the sprags 16 will project from the outer cage 24 so that the cam surfaces 18 thereon engage the outer race 14. It is desirable that the openings 36 through the outer cage 24 be substantially the same size as the sprags 16 so that the edges of the openings 28 and 36 will be a close fit about the sprags 16 and allow the minimum amount of movement therebetween. Thus if there is any relative rotation between the cages 22 and 24, the edges of the openings 28 and 36 will engage all of the sprags 16 on the opposite sides thereof and at radially displaced points and cause all the sprags 16 to simultaneously tilt the same amounts in the same directions. Conversely if one of the sprags 16 tilts, it will cause the cages 22 and 24 to relatively rotate in opposite directions and force all of the sprags 16 to simultaneously move the same amount. It can thus be seen that when the races 12 and 14 rotate so as to cause the sprags 16 to move into or out of wedging engagement, all of the sprags 16 will simultaneously move together.

Figure 3:
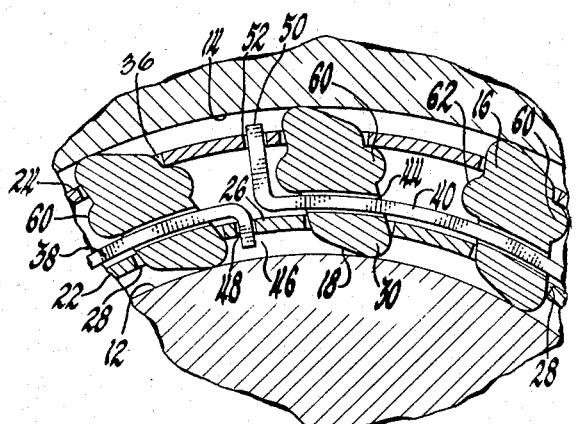
Fig. 3 is a cross sectional view taken substantially along the plane of line 3—3 in Fig. 2.
Figure 4:
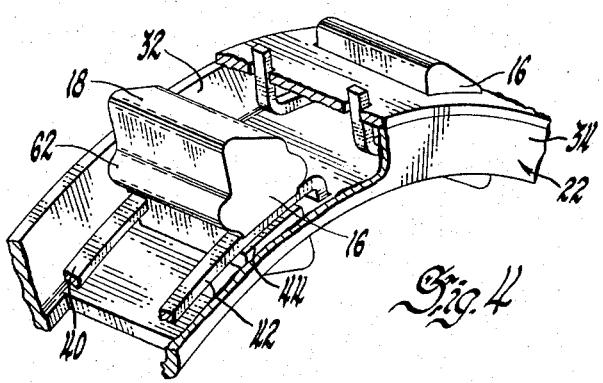
Fig. 4 is a fragmentary perspective view of a portion of the clutch of Fig. 1.

In order to maintain the cam surfaces 18 on the sprags 16 against the race surfaces 12 and 14, spring means 38 may be provided for resiliently applying a clockwise couple simultaneously to all of the sprags 16 (as best shown in Fig. 3) and thus bias the ends of the sprags 16 against the races 12 and 14. In the present instance the spring means 38 includes a pair of annular springs 40 and 42 (such as a single turn clockspring) that are adapted to be disposed between the cages 22 and 24. Although the springs 40 and 42 may be disposed in any desired location, it has been found desirable to place them in closely spaced relation to the inner cage 22. In order to provide a unit handling assembly, the springs 40 and 42 may be slidably disposed loosely in slots 44 in the opposite sides of each sprag 16 so that the sprags 16 cannot fall out of the cages when the clutch 10 is disassembled from the races 12 and 14. One end 46 of each of the springs 40 and 42 may be secured to the inner cage 22 as by being bent to project radially through an opening 48 in the inner cage 22. The other end thereof may be secured to the other cage 24 by having its opposite end 50 project radially outwardly through an opening 52 in the outer cage 24.

It should be noted that since the sprags 16 project through the openings 28 and 36 in the cages 22 and 24, movement of the cages in opposite directions will cause simultaneous and corresponding tilting of all the sprags 16. Accordingly, the springs 40 and 42 may be tensioned so as to bias the outer cage 24 clockwise relative to the inner cage 22 (see Fig. 3) and thus tend to tilt the sprags 16 clockwise and force the cam surfaces 18 on the ends thereof against the races 12 and 14 at all times.

From the foregoing it may be seen that when the outer race 14 rotates counterclockwise relative to the inner race 12, the ends 18 of sprags 16 will slidably engage the races. Although the force of springs 40 and 42 on the cages 22 and 24 will tend to tilt the sprags 16 clockwise, the friction forces will oppose and counteract this tendency. Thus the outer race 14 may overrun the inner race 12 without imparting a driving connection through the sprags to the inner race.

However, if the outer race 14 should suddenly reverse its direction of rotation, the friction between the ends of the sprags 16 and the races 12 and 14 will assist the spring forces. This in turn will cause the sprags 16 to tilt clockwise and move the longer diagonals toward radial clutch engaging positions wherein the sprags 16 are wedged between the races 12 and 14 and transmit torque from one race to the other. It should be noted that when the sprags 16 move into wedging engagement, the cages 22 and 24 must move. However since the springs 40 and 42 tend to move the cages 22 and 24 in this direction, the springs 40 and 42 will move the cages 22 and 24 rather than the sprags 16 moving them. It is thus apparent that the inertia of the cages will not interfere with the rapid movement of the sprags.

In order to retain the cages 22 and 24 concentric with the races 12 and 14, shoulder means 60 may be provided on the sprags 16. In the present instance each of the sprags 16 is provided with integral projections in the form of laterally projecting lugs that extend from the opposite sides thereof to form arcuate surfaces 62 thereon. The surfaces 62 are adapted to engage the interior of the outer cage 24 and retain outer cage 24 properly centered. The surfaces 62 are preferably concentric with the effective rolling center of the inner cam surface 18 against the inner race 12. Hence, both cages 22 and 24 will be positioned in spaced relation to and substantially coaxial with the races 12 and 14 regardless of the angular disposition of the sprags 16.

Figure 5:
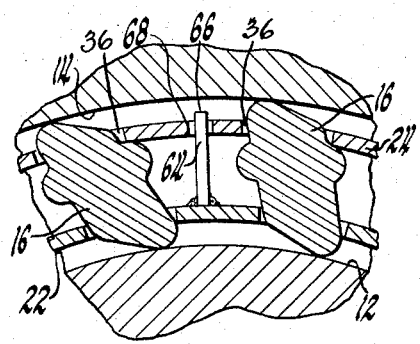
Fig. 5 is a view showing a modification of the clutch.

In the modification of Fig. 5, one or more cantilever springs 64 have their inner ends secured to a side of the radial flange 32 or 34. The spring 64 is adapted to project radially outwardly. The outer ends 66 of the springs 64 are adapted to project through an opening 68 in the outer cage 24. This spring 64 is preferably positioned so as to force the outer cage 24 clockwise relative to the inner cage 22 substantially as previously described with reference to Figures 1 through 4.

It is to be understood that, although the invention has been described with specific reference to a particular embodiment thereof, it is not to be so limited since changes and alterations therein may be made which are within the full intended scope of this invention as defined by the appended claims.

What is claimed is:

1. A one way clutch adapted to be disposed between a pair of coaxial cylindrical races comprising an inner cage in radially spaced relation to both races and having a plurality of circumferentially spaced openings, a pair of radially extending flanges on the inner cage, an outer cage disposed concentric with said inner cage and rotatably journalled on said flanges, said outer cage having a plurality of circumferentially spaced openings positioned to register with said openings in said inner cage, a plurality of sprags disposed in said registering openings with the opposite ends thereof projecting from said cages to engage said races, laterally projecting lugs on some of said sprags engaging and supporting one of said cages in radially spaced relation to both of said races, and a cantilever spring having one end thereof secured to said inner cage and the other end thereof secured to said outer cage for resiliently biasing said cages in circumferentially opposite directions.

2. A one way clutch adapted to be disposed between a pair of coaxial cylindrical races, said clutch comprising an inner cage having a cylindrical base portion with a plurality of circumferentially spaced openings therein, a pair of parallel radial flanges projecting outwardly from said base portion, an outer cage disposed concentrically about said inner cage and comprising a cylindrical member carried by said flange for relative rotation with respect to said inner cage, said member having a plurality of circumferentially spaced openings positioned to register with said openings in said inner cage, a plurality of sprags disposed in said registering openings with the opposite ends thereof projecting from said cages to engage said races, lugs laterally projecting from some of said sprags and supporting one of said cages radially from and concentric to said races, and at least one cantilever spring having one end thereof secured to said inner cage and the other end thereof secured to said outer cage for resiliently biasing said cages in circumferentially opposite directions.

3. In a one way clutch disposed between a pair of coaxial cylindrical races, said clutch comprising an inner cage in radially spaced relation to both races, the inner cage having a cylindrical base portion with a plurality of circumferentially spaced openings therein, a pair of parallel radial flanges projecting outwardly from said base portion, an outer cage spaced from both races and disposed concentrically about said inner cage and comprising a cylindrical member carried by said flange for relative rotation with respect to said inner cage, said member having a plurality of circumferentially spaced openings positioned to register with said openings in said inner cage, a plurality of sprags disposed in said registering openings with the opposite ends thereof projecting from said cages to engage said races, at least a portion of said sprags having laterally projecting lugs engaging one of said cages for retaining said cages concentric with said races, a spring member extending between the cages and having one end secured to one of said cages, and a radially projecting portion on said spring extending through an opening in the other cage, said spring member yieldably biasing the cages in opposite circumferential directions.

4. In a one-way clutch, a series of spaced tiltable sprags having opposite ends respectively engageable with a pair of relatively rotatable annular races, a pair of annular cages between and in radially spaced relation to both of said races, one of said cages being rotatably supported by the other cage, said cages having correspondingly positioned circumferentially spaced openings, laterally projecting lugs on some of said sprags radially supporting one of said cages in spaced relation to said races, each sprag extending through and fitting within corresponding openings in both cages, an arcuate spring having a body portion in uniformly radially spaced relation between said cages, the sprags having transversely extending end grooves loosely receiving said body portion to secure the clutch assembly in unit handling relation, and a radially extending projection on each spring end respectively interlocking with said cages and urging the cages in opposite circumferential directions to simultaneously tilt all of the sprags toward a race-driving relation.

5. In a one-way clutch, a series of tiltable sprags having opposite ends engageable with a pair of relatively rotatable coaxial cylindrical races, a pair of annular cages between and radially spaced from both races, one of said cages having a radially projecting annular flange journalled on said other cage, lugs laterally projecting from some of said sprags and supporting one of the cages in radially spaced relation to both of said races, the cages having a series of correspondingly located spaced openings through which the sprags fit and which locate the sprags in circumferentially spaced relation, each of said sprags having a transversely extending groove opening onto the flange, an arcuate spring having a body portion concentric with the cages and loosely extending through said grooves in uniformly spaced radial relation to both of said cages, radially projecting portions on each end of the spring respectively secured to said cages, and said spring yieldably urging the cages in opposite circumferential directions to simultaneously tilt all of the sprags towards a race-driving relation.

6. In a one-way clutch, a series of circumferentially spaced tiltable sprags having opposite ends engageable with a pair of relatively rotatable coaxial cylindrical races, a pair of annular cages between and spaced from both races, said cages having correspondingly positioned circumferentially spaced openings which closely receive the sprags and locate them in circumferentially spaced relation, lugs extending from some of the sprags and supporting one of the cages in radially spaced relation to both of said races, a radially projecting flange on one of the cages journalled on the other cage to provide for relative coaxial cage rotation, each sprag having a transversely extending groove through its end and closed at one side by said flange, an arcuate spring member having a body portion concentric with the cages and radially spaced therebetween and loosely extending through the grooves in the sprags to secure the sprags in unit-handling relation with said cages, a laterally projecting portion on one end of the spring extending through and fitting within an opening in one of said cages, and a laterally projecting portion on the other end of said spring adjacent to said first mentioned projecting portion and fitting within and extending through an opening in said other cage.

7. In a one-way clutch, a series of circumferentially spaced tiltable sprags having opposite ends engageable with a pair of relatively rotatable coaxial cylindrical races, a pair of annular cages between and radially spaced from both of said races, lugs on said sprags and supporting one of the cages in spaced relation to both races, said cages having circumferentially spaced correspondingly located sprag-receiving openings therethrough which closely receive the sprags and locate the sprags in circumferentially spaced relation, a pair of radially projecting flanges on one of the cages journalled on the other cage to provide for relative coaxial rotation of said cages, a single-turn annular spring having a body portion circumferentially extending between and uniformly spaced from said cages, the spring having closely spaced ends, the ends of the sprags having transversely extending grooves laterally opening onto one of the flanges and loosely receiving the body portion of the spring to secure the sprags in unit-handling relation with the cages and with the spring, and substantially radially projecting end portions on the spring respectively in inter-locking engagement with said cages to urge the cages in circumferentially opposite directions for yieldably tilting the sprags into race-driving relation.

8. In a one-way clutch, tiltable sprags having opposite ends engageable with a pair of relatively rotatable coaxial cylindrical races to provide a one-way driving relation between said races, a pair of annular cages between and radially spaced from both of said races, an annular flange on one cage journalled on the other cage, laterally projecting lugs on the sprags supporting one of the cages in radially spaced relation to both races, the cages having cooperative openings through which the sprags extend and which position the sprags in circumferentially spaced relation, a single turn spring member extending circumferentially of and between the cages and fastened at one end of one of said cages and having a radially projecting portion at its other end fitting through an opening in the other cage, and said spring member circumferentially urging the cages in opposite directions to simultaneously tilt all of the sprags into driving engagement with both races.

9. In a one-way clutch, a series of circumferentially spaced tiltable sprags having opposite ends engageable with a pair of relatively rotatable coaxial cylindrical races, a pair of annular cages between and radially spaced from both of said races, said cages having corresponding circumferentially spaced openings through which the sprags extend and in which the sprags fit, annular flanges on one of the cages in journalled relation with said other cage, lugs projecting from the sprags and supporting one of said cages in radially spaced relation to both races, a single turn spring member disposed circumferentially of and between said cages and secured at one end to one of said cages, and said spring member having a radially extending projection at its other end fitting through an opening in the other cage and circumferentially urging one cage with respect to the other to simultaneously tiltably shift all of the sprags towards race gripping engagement.

References Cited in the file of this patent
UNITED STATES PATENTS

| | | |
|---|---|---|
| 2,173,604 | Dodge | Sept. 19, 1939 |
| 2,473,250 | Hoffman | June 14, 1949 |
| 2,614,670 | Heintz | Oct. 21, 1952 |
| 2,624,436 | Gamble | Jan. 6, 1953 |
| 2,724,471 | Dodge | Nov. 22, 1955 |
| 2,750,019 | Ferris | June 12, 1956 |
| 2,753,028 | Dodge | July 3, 1956 |